United States Patent
Wälde et al.

(10) Patent No.: US 12,174,052 B2
(45) Date of Patent: Dec. 24, 2024

(54) RADAR MEASURING DEVICE

(71) Applicant: VEGA GRIESHABER KG, Wolfach (DE)

(72) Inventors: Steffan Wälde, Niedereschach (DE); Christian Weinzierle, Wolfach (DE)

(73) Assignee: VEGA GRIESHABER, Wolfach (DE)

( * ) Notice: Subject to any disclaimer, the term of this patent is extended or adjusted under 35 U.S.C. 154(b) by 444 days.

(21) Appl. No.: 17/343,259

(22) Filed: Aug. 6, 2021

(65) Prior Publication Data

US 2022/0082426 A1    Mar. 17, 2022

(30) Foreign Application Priority Data

Sep. 17, 2020   (EP) ..................................... 20196729

(51) Int. Cl.
| | |
|---|---|
| *G01F 23/284* | (2006.01) |
| *G01F 25/20* | (2022.01) |
| *G01S 13/88* | (2006.01) |
| *H01Q 1/40* | (2006.01) |
| *H01Q 1/52* | (2006.01) |

(52) U.S. Cl.
CPC ............ *G01F 23/284* (2013.01); *G01F 25/20* (2022.01); *G01S 13/88* (2013.01); *H01Q 1/40* (2013.01); *H01Q 1/525* (2013.01)

(58) Field of Classification Search
CPC ........ G01F 23/284; G01F 25/20; G01S 13/88; H01Q 1/40; H01Q 1/525
USPC ....................................................... 342/124
See application file for complete search history.

(56) References Cited

U.S. PATENT DOCUMENTS

| | | | | |
|---|---|---|---|---|
| 6,057,797 A | * | 5/2000 | Wagner | G01S 7/032 343/711 |
| 7,359,782 B2 | * | 4/2008 | Breed | G01S 17/931 710/48 |
| 8,184,039 B2 | * | 5/2012 | Garrod | G01F 1/002 342/124 |
| 8,447,474 B2 | * | 5/2013 | Breed | G01S 17/931 345/9 |
| 9,007,197 B2 | * | 4/2015 | Breed | G01S 17/08 340/436 |

(Continued)

FOREIGN PATENT DOCUMENTS

| | | | |
|---|---|---|---|
| DE | 102016217614 A1 | 9/2016 | |
| EP | 1046927 A2 * | 10/2000 | ............. G01S 13/87 |

(Continued)

OTHER PUBLICATIONS

EPO search report for related European application 20196729.6 issued on Mar. 2, 2021.

*Primary Examiner* — Nuzhat Pervin
(74) *Attorney, Agent, or Firm* — William Gray Mitchell (57) ABSTRACT

A radar measuring device with a housing at least partially filled with a potting compound, a general-diffuse planar antenna arranged in the housing, at least one transmitter and at least one receiver that are connected to the planar antenna, and a lens arranged in a main emission direction of the planar antenna for radiation emitted from the planar antenna, wherein a separating apparatus is arranged in the housing and is designed and arranged in such a way that a penetration of the potting compound into an area within the separating apparatus and between the antenna and the lens is prevented.

13 Claims, 4 Drawing Sheets

(56) References Cited

U.S. PATENT DOCUMENTS

| | | | |
|---|---|---|---|
| 9,041,596 B2 * | 5/2015 | Kuwahara | G01S 13/42 |
| | | | 342/147 |
| 9,091,584 B2 * | 7/2015 | Vogt | H01Q 1/225 |
| 9,103,671 B1 * | 8/2015 | Breed | G01S 13/865 |
| 9,810,779 B2 * | 11/2017 | Matsumura | G01S 7/032 |
| 11,408,974 B2 * | 8/2022 | Mayer | G01F 23/284 |
| 11,573,115 B2 * | 2/2023 | Mayer | H01P 11/008 |
| 11,774,277 B2 * | 10/2023 | Dieterle | G01F 23/284 |
| | | | 342/124 |
| 11,796,375 B2 * | 10/2023 | Winfried | G01S 7/03 |
| 2017/0138778 A1 * | 5/2017 | Falk | G01S 7/038 |
| 2017/0141474 A1 * | 5/2017 | Hengstler | H01Q 1/125 |
| 2022/0049984 A1 * | 2/2022 | Winfried | H01Q 1/225 |
| 2022/0120848 A1 * | 4/2022 | Schultheiss | H01Q 1/1207 |
| 2022/0128352 A1 * | 4/2022 | Binder | G01B 15/00 |
| 2022/0221322 A1 * | 7/2022 | McCormick | G01S 7/354 |

FOREIGN PATENT DOCUMENTS

| | | | | |
|---|---|---|---|---|
| EP | 3168580 A1 * | 5/2017 | | G01F 23/284 |
| EP | 393711 A1 | 2/2019 | | |
| EP | 3696516 A1 | 2/2019 | | |
| WO | WO-2018050420 A1 * | 3/2018 | | G01F 23/284 |

* cited by examiner

RADAR MEASURING DEVICE

CROSS REFERENCE TO RELATED APPLICATIONS

This patent application claims priority to European Patent Application 20196729.6, filed on Sep. 17, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a radar measuring device.

Background of the Invention

Various radar measuring arrangements, radar measuring devices, and radar measuring methods are known from the prior art. For example, radar measuring arrangements and radar measuring devices are used in the prior art in process automation for fill level measurement or more generally for distance measurement. In order to also be able to detect moving objects, in addition to determining the distance, a speed determination is also carried out in a separate measurement in the prior art. This can be done either with the same radar sensor or with an additional radar sensor.

Due to the far-reaching independence from external influences and the achievement of higher working frequencies with the assistance of novel semiconductor components, very precise measurement results can be reliably determined with modern radar measuring devices. Known radar fill level measuring devices measure the distance to a product and other reflection points, hereinafter also referred to as "reflectors," within a container by using a time-of-flight method or an FMCW method (FMCW=Frequency Modulated Continuous Wave).

In applications in the field of automation technology, mainly optical methods and measuring arrangements have been used thus far.

The term automation technology is understood to mean a subarea of technology that includes all measures for the operation of machines and systems without the involvement of humans; thus, the subarea of process automation can be understood as the lowest level of automation. The goal of process automation is to automate the interplay of individual components of a plant system in the chemical, crude oil, paper, cement, shipping, and mining sectors. For this purpose, a variety of sensors are known, which are adapted in particular to the specific requirements of the process industry, such as mechanical stability, insensitivity to contamination, extreme temperatures, and extreme pressures. Measurement values of these sensors are usually transmitted to a control room, in which process parameters such as fill level, flow, pressure, or density can be monitored and settings for the entire plant system can be changed manually or automatically.

A subarea of automation technology relates to logistics automation. With the assistance of distance and angle sensors, processes within a building or within a single logistics system are automated in the area of logistics automation. Typical applications include systems for logistics automation in the area of baggage and freight handling at airports, in the area of traffic monitoring (toll systems), in trade, package distribution, and also in the area of building security (access control). The examples listed above have in common that a presence detection in combination with an exact measurement of the size and position of an object is required on the respective application side. Known radar systems have thus far not been able to meet the needs, for which reason different sensors based on optical measurement methods using lasers, LEDs, 2D cameras, or 3D cameras that detect distances according to the time-of-flight principle (ToF) are used in the known prior art.

Another subarea of automation technology relates to factory automation. Applications for this can be found in a wide variety of industries such as automotive manufacturing, food production, the pharmaceutical industry, or generally in the field of packaging. The goal of factory automation is to automate the production of goods by machines, production lines, and/or robots, i.e., allowing them to run without the involvement of humans. The sensors used here, and the specific requirements with regard to measurement accuracy in the detection of the position and size of an object, are comparable to those in the previous example of logistics automation. Therefore, sensors based upon optical measurement methods are usually also used on a large scale in the area of factory automation.

To date, in the area of logistics automation as well as in the areas of factory automation and safety technology, optical sensors have dominated. These are fast and cost-effective and can reliably determine the position and/or the distance to an object on the basis of the optical radiation that can be focused with relative ease, which is the basis of the measurement. A significant disadvantage of optical sensors, however, is their increased need for maintenance, because even in the areas listed above, after a few thousand hours of operation, contamination of the sensor can be observed, which massively affects the measurement. In addition, especially when used in production lines, the measurement can be impaired with fog formation due to oil vapors or other aerosols and can lead to additional contamination of optical sensors.

In the process industry, and in particular in process automation, radar measuring devices, and in particular radar fill level measuring devices, are used reliably under harsh conditions such as high and low temperatures as well as under extreme pressures, in dusty environments, and in aggressive media.

Radar measuring devices in the C band, which operate in the frequency range of approximately 6 GHz and which can be approved according to the regulatory authorities, were the first to establish themselves on the market. These devices have the disadvantage of a large design, because the antenna size depends on the wavelength used. Radar measuring devices in the K band were therefore developed. The K band describes the frequency range of approximately 25 GHz. The antenna sizes that can be achieved in this way are significantly reduced compared to the antennas required for the C band. The first radar measuring devices, and in the present case in particular a radar fill level measuring device for liquids, which work in the W band, i.e., the frequency range of approximately 80 GHz, have been available since 2016. In this way, very compact antenna designs can be realized, which also allow small process connections for the arrangement of the radar measuring devices in a process environment.

The radio licenses for the above devices must be obtained worldwide. There are requirements in this regard from the various regulatory authorities, which determine for their region under which conditions a radar measuring device may be approved and sold in the respective country. For example, in Europe and the United States there are regulations that allow fill level radar devices that operate in the C band, K band, W band, and V band. V band radar devices operate in a frequency range of approximately 60 GHz.

When these radar measuring devices are licensed, not only the used frequency range plays a role, but also other properties of the radar measuring devices, such as the emitted high-frequency power, the orientation of the radar device, and the emission properties of the antenna. A distinction is also made between whether a device is used in a closed container or in the open.

The requirements for a W band radar measuring device that is approved in the open are, for example, such that the antenna must have an opening angle of ≤8° and must be mounted vertically downwards. The sidelobes must also be in the range of ≥60° in relation to the main lobe, i.e., the emission characteristics in the main emission direction of the antenna must be attenuated by 38 dB.

Figure 1A:
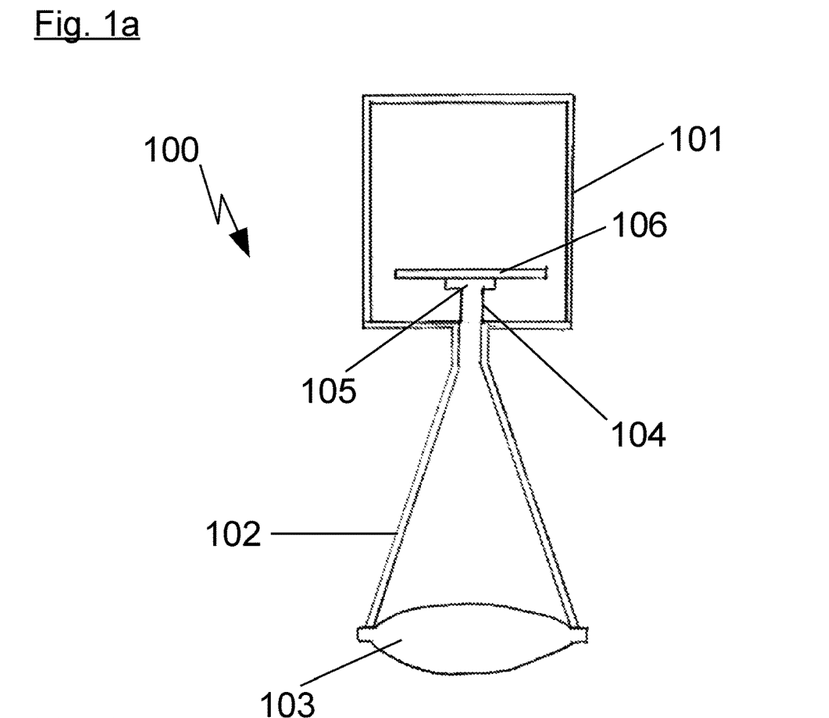
FIGS. 1A and 1B are line drawings evidencing an exemplary embodiment of a radar fill level measuring device, having a horn antenna according to the prior art (already discussed).

A radar measuring device 100 known from the prior art, here a radar fill level measuring device, is shown in FIG. 1a.

The radar fill level measuring device 100 shown in FIG. 1a essentially has a housing 101, a circuit board 106 arranged in the housing 101 with a high-frequency unit (HF unit) 105 arranged on the circuit board 106 with a radar chip. The high-frequency unit 105 contains, for example, transmitters and receivers for high-frequency signals in the desired band.

According to the present application, a high-frequency unit is understood to be the part of a radar measuring device that generates, transmits, and receives high-frequency signals.

In the radar fill level measuring device 100 shown in FIG. 1a, the HF unit 105 is coupled to a horn antenna 102, at the front end of which a dielectric lens 103 is arranged in the main emission direction H. The length of the horn antenna 102 is largely responsible for the emission properties of the horn antenna 102 and must be designed using calculations and simulations in such a way that all relevant licensing aspects are met. Noteworthy, in particular, are the opening angle defined by the licenses and the prescribed sidelobe suppression. The lens 103 sits on the front in the horn antenna 102 and is configured such that the geometric length of the antenna is shortened compared to a horn antenna without a lens. In the present exemplary embodiment, a convex-convex or biconvex lens 103, i.e., a lens with two outwardly curved surfaces, is shown. In this way, a compact design can be achieved.

Figure 1B:
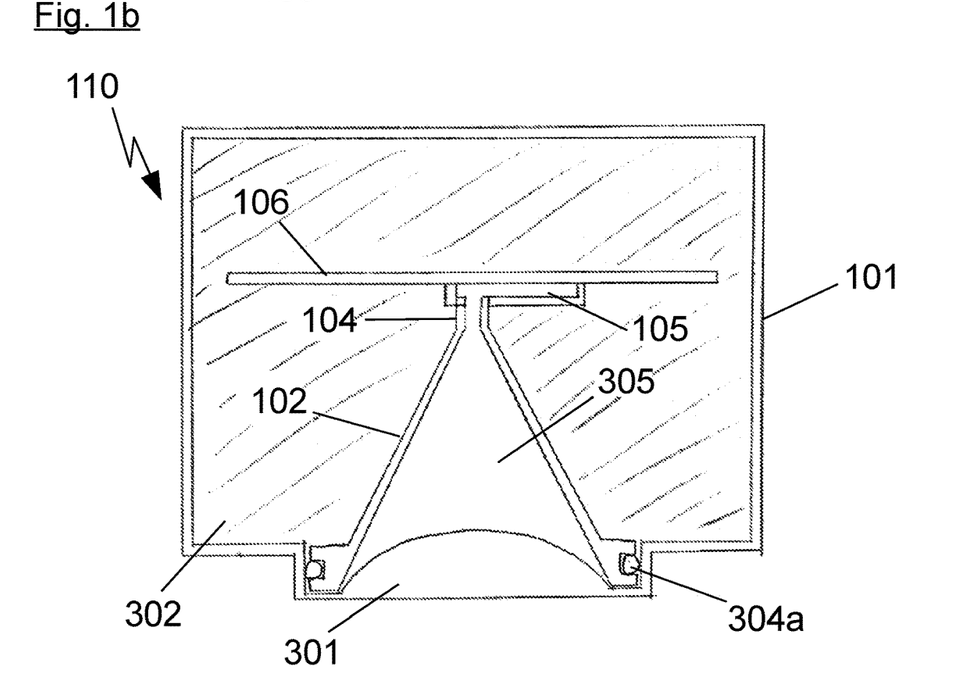

In FIG. 1b, a further configuration of a radar fill level measuring device 100 according to the prior art is shown, wherein a plano-convex lens 301 is used compared to the configuration of FIG. 1a.

In addition to a more compact antenna design, the lenses 103, 301 also offer the advantage that they act as a separation from the process and the process medium. The measuring electronics arranged on the circuit board 106, and in particular the HF unit 105, can be protected against high and low pressures and temperatures, dust, moisture, and other environmental conditions that are negative for the measuring electronics by the lens 103, 301.

The lenses 103, 301 are often configured in such a way that they have other properties in addition to good high-frequency properties. These include, for example, drip cones or drip edges, which are configured in such a way that condensate separating on the lens 103, 301 can advantageously drip off quickly, or rainwater on the side of the antenna does not run directly in front of the lens.

It is possible that the horn antenna 102 is located outside the device housing 101 (see FIG. 1a) or also inside (see FIG. 1b).

Another aspect that especially relates to radar-based fill level measuring devices in the process industry is explosion protection.

In industrial plants, gases or dusts can often occur in a concentration that can be ignited by electrical devices and then lead to an explosion. For this reason, devices are developed and built in such a way that such an ignition cannot occur, or an ignition can only occur within the housing and this in turn has no effects on the environment. The devices are then divided into so-called ignition protection classes, depending on the explosion protection requirements they meet.

One possibility of avoiding the risk of ignition within the radar fill level measuring device 100 is shown in FIG. 1b. For this purpose, the device housing 101 and the electronics located therein are potted with a potting compound 302. In this way, it is achieved that all possible cavities within the device housing 101, in which explosive gas mixtures could collect, are filled with the potting compound 302. Therefore, no explosive gas can accumulate. The basis of such a potting compound 302 can be silicone, for example. It should also be non-conductive and should harden to a certain extent after potting.

A further possibility for avoiding ignition is to limit the power in the area of a cavity to a certain degree by means of appropriate wiring.

A combination of both concepts is also possible.

In the radar fill level measuring devices 100 shown in FIGS. 1a and 1b, there is a cavity in the horn antenna 102 that must not be potted with the potting compound 302. High-frequency signals that are passed through the horn antenna 102 would be too greatly attenuated by the potting compound 302, which would have a negative effect on the measurement performance of the radar fill level measuring device 100. The lens 103 in the horn antenna 102 would also no longer function, because it is designed to be surrounded by air.

For this reason, the wiring of the HF unit 105, which is located directly at the entrance of the horn antenna 102 and thus in an unpotted area, is designed in such a way that its power is limited and the HF unit 105 only heats up to a certain degree.

From the radar measuring devices known from the prior art, it is considered disadvantageous that they require a complex structure with a horn antenna and, as a result, a comparatively involved manufacturing process and many different components in order to be allowed to be marketed under licensing law and to provide satisfactory measurement results.

From a licensing point of view, far fewer requirements are placed on the antenna characteristics in the V band. This frequency band differs from the other bands mentioned above in that other, non-fill level devices can also be licensed. These are, for example, radar-based motion detectors, devices that can be operated using gesture recognition, or distance meters in the field of consumer electronics. These devices fall under the term "Short Range Devices" (SRD).

Highly integrated radar chips are therefore increasingly available in the V band for the consumer electronics sector. Because these radar chips are becoming increasingly more inexpensive, there is a desire to use these radar chips for radar measuring devices and especially for radar fill level measuring devices.

Due to the lower requirements for the emission properties of the antennas in the V band, antennas are also used in this frequency range that would not have complied with the permissible emission properties in the other frequency bands. Planar antennas, in particular patch antennas and patch array antennas, can be given as examples of this. These antennas offer particular advantages, because they have a particularly flat design and can therefore be integrated into a "system on a chip," i.e., on a radar system integrated on a single carrier.

Patch antennas consist of metal surfaces (patches), which are arranged on a dielectric insulating substrate and can take different shapes.

Patch array antennas consist of a large number of patch antennas, which are arranged and interconnected at certain distances from one another. With a suitable arrangement and actuation of the patch elements, patch array antennas can have a higher directional effect than patch antennas. In a particular actuation, patch array antennas are also referred to as phased array antennas. In the case of these antennas, it is possible to change the antenna characteristics of the antenna, and thus in particular its main emission direction, by means of a phase-shifted actuation of the individual patch elements.

Disadvantages of both antenna types are, among other things, the poor sidelobe suppression and the continued inadequate directional effect.

Here is where the present invention comes into play.

The problem addressed by the present invention to provide a radar measuring device with a general-diffuse planar antenna. Advantageous configurations and variants of the invention emerge from and the following description. The features listed individually herein can be combined with one another in any technically sensible manner, as well as with the features explained in more detail in the following description, and can constitute other advantageous variants of the invention.

BRIEF SUMMARY OF THE INVENTION

In a preferred embodiment, a radar measuring device (100, 300) with a housing (101, 306, 402) at least partially filled with a potting compound (302), a general-diffuse planar antenna arranged in the housing (101, 306, 402), at least one transmitter and at least one receiver that are connected to the planar antenna, and a lens (103, 301) arranged in a main emission direction H of the planar antenna for radiation emitted from the planar antenna, characterized in that a separating apparatus (303, 401) is arranged in the housing (101, 306, 402) and is designed and arranged in such a way that a penetration of the potting compound (302) into an area within the separating apparatus (303, 401) and between the antenna and the lens (103, 301) is prevented.

In another preferred embodiment, the radar measuring device (100, 300) as described herein, characterized in that the separating apparatus (303, 401) is made from a plastic.

In another preferred embodiment, the radar measuring device (100, 300) as described herein, characterized in that the separating apparatus (303, 401) is designed to radially surround the planar antenna at the rear.

In another preferred embodiment, the radar measuring device (100, 300) as described herein, characterized in that the separating apparatus (303, 401) is designed to radially surround the lens (103, 301) at the front.

In another preferred embodiment, the radar measuring device (100, 300) as described herein, in that the separating apparatus (303, 401) is designed to widen conically in the main emission direction H.

In another preferred embodiment, the radar measuring device (100, 300) as described herein, in that the separating apparatus (303, 401) has a front and/or a rear sealing apparatus in the main emission [direction].

In another preferred embodiment, the radar measuring device (100, 300) as described herein, characterized in that the front sealing apparatus is arranged radially to the separating apparatus (303, 401).

In another preferred embodiment, the radar measuring device (100, 300) as described herein, characterized in that the rear sealing apparatus is arranged axially to the separating apparatus (303, 401), in particular between the separating apparatus (303, 401) and a carrier for the antenna.

In another preferred embodiment, the radar measuring device (100, 300) as described herein, characterized in that the front sealing apparatus and/or the rear sealing apparatus is arranged in a groove of the separating apparatus (303, 401) and is preferably designed as an O-ring.

In another preferred embodiment, the radar measuring device (100, 300) as described herein, characterized in that the separating apparatus (303, 401) is designed integrally with the housing (101, 306, 402).

In another preferred embodiment, the radar measuring device (100, 300) as described herein, characterized in that the separating apparatus (303, 401) is sealingly connected, in particular glued, to a carrier for the antenna.

In another preferred embodiment, the radar measuring device (100, 300) as described herein, characterized in that the separating apparatus (303, 401) is made from an electrically conductive plastic.

In another preferred embodiment, the radar measuring device (100, 300) as described herein, characterized in that the lens (103, 301) is designed as a plano-convex lens or as a Fresnel lens (501).

DETAILED DESCRIPTION OF THE INVENTION

A radar measuring device according to the invention with a housing at least partially filled with a potting compound, a general-diffuse planar antenna arranged in the housing, at least one transmitter and at least one receiver that are connected to the planar antenna, and a lens arranged in a main emission direction of the planar antenna [for] radiation emitted from the planar antenna is characterized in that a separating apparatus is arranged in the housing and is designed and arranged in such a way that a penetration of the potting compound into an area within the separating apparatus and between the antenna and the lens is prevented.

By means of such a separating apparatus, it is achieved that the interior of the housing can be filled with a potting compound and, at the same time, a dielectric lens can be used for focusing the emitted electromagnetic waves. The area between the emission elements and the lens, which is decisive for the properties of the planar antenna, thus remains free of potting compound, so that the antenna properties in this area are not subject to any unpredictable fluctuations, for example due to individual areas with potting compound.

In the present case, a general-diffuse planar antenna is understood to mean planar antennas, that is to say in particular patch antennas and patch array antennas, which emit freely in the air, that is to say they do not couple into a waveguide or a dielectric conductor, in particular. The electromagnetic radiation emitted by the patch elements therefore passes directly in the air.

In a particularly simple and inexpensive variant, the separating apparatus can be formed from a plastic. By a configuration of the separating apparatus out of a plastic, it can be produced simply and inexpensively. In addition, the separating apparatus can be easily adapted to variously dimensioned radar measuring devices. For this purpose, the separating apparatus can, for example, be made of a thermoplastic material. In this case, the production can be carried out particularly easily by an injection molding process or extrusion.

It is advantageous when the separating apparatus is designed to radially surround the antenna at the rear.

In the present application, terms such as "rear" and "front" should always be understood in relation to the main emission direction of the planar antenna used. "Rear" is thus, in [relation] the separating apparatus, the part of the separating apparatus that is oriented towards the emitting radar chip or the antenna. "Front" is the part of the separating apparatus that is oriented away from the radar chip or towards the lens.

The separating apparatus is thus advantageously designed in such a way that it radially surrounds the antenna and preferably completely encloses it. Radially surrounding should also be understood to mean a situation in which the separating apparatus is arranged at a distance from the substrate in the main emission direction, for example by a spacer arranged on the substrate or a seal. The decisive factor is that the separating apparatus, at its end of the antenna oriented towards the antenna, has a clear width that does not overlap with a surface of the antenna.

In an advantageous development, the separating apparatus is configured in such a way that it is designed to radially surround the lens at the front. In this way, it is achieved that the lens surface can be maximally used.

The separating apparatus advantageously extends linearly.

In particular, the separating apparatus can be designed to widen conically in the main emission direction. In this way, it is made possible that, compared to a surface of the antenna, a lens with a larger surface extending perpendicular to the main emission direction can be used, while, at the same time, as large a part of the housing as possible can be filled with the potting compound.

In order to prevent the potting compound from penetrating into the area between antenna and lens, i.e., into the interior of the separating apparatus, it can be sensible for the separating apparatus in the main emitting apparatus to have a front and/or a rear sealing apparatus.

In particular, the front sealing apparatus can be arranged radially in relation to the separating apparatus. In this way, it can be achieved that the sealing apparatus seals against a part of the housing which is arranged radially with respect to the separating apparatus. This can be useful, for example, when the lens is formed integrally with the housing. It can then be achieved that the separating apparatus is arranged within a circumferential step of the housing and is clamped there by means of the sealing apparatus. In this way, the separating apparatus can be prevented from slipping in the housing.

It can be further advantageous for the rear sealing apparatus to be arranged axially to the separating apparatus, in particular between the separating apparatus and the substrate of the antenna. In this configuration, the sealing apparatus can seal against a surface of the substrate, such that no additional sealing surface need be provided.

A particularly simple and inexpensive seal can be achieved when the front sealing apparatus and/or the rear-side sealing apparatus is arranged in a groove of the separating apparatus and is preferably designed as an O-ring. By an arrangement in a groove, the sealing apparatus can be easily placed and held for assembly. By a configuration as an O-ring, readily available and proven standard components can be used.

In one variant, the separating apparatus can be designed integrally with the housing. Such a configuration creates an arrangement in which the separating apparatus is fixed relative to the housing. In this way, for example, an incorrect alignment of the separating apparatus and sealing at a transition from the separating apparatus to the housing can be avoided. This significantly reduces the number of components required and thus simplifies assembly of the radar measuring device.

In one configuration, both the separating apparatus and the lens can be formed integrally with the housing.

In order not to require a seal at a transition from the separating apparatus to the carrier of the antenna, the separating apparatus can be materially connected to the carrier, in particular glued or welded. A welded connection can be produced, for example, by plastic welding, in particular with a laser.

The separating apparatus can further be made of an electrically conductive plastic. With such a configuration, it is achieved that undesired sidelobes of the antenna characteristic—in the present case, these are in particular sidelobes that are not oriented in the direction of the lens and therefore would not be bundled by it—are suppressed by the separating apparatus. Further, the emission of electronic magnetic fields from directions other than from the main emission direction of the antenna is attenuated by a separating apparatus made of conductive plastic, so that the reception of the antenna is also improved.

The lens can be designed, for example, as a plano-convex lens or as a Fresnel lens. A plano-convex lens has the advantage that it can be incorporated with its flat side facing outwards, i.e., oriented towards the process. The radar measuring device can thus be manufactured with a largely flat surface.

By configuration of the lens as a Fresnel lens, significant material savings can be achieved compared to conventional lenses. A reduced material thickness also reduces the formation of blowholes, i.e., a reduced formation of air pockets in the material of the lens is achieved. Overall, material costs and the manufacturing effort for the lens can thus be reduced. In addition, due to the reduced thickness of the Fresnel lens, a headroom of the radar measuring device can be further reduced.

DETAILED DESCRIPTION OF THE FIGURES

Figure 2A:
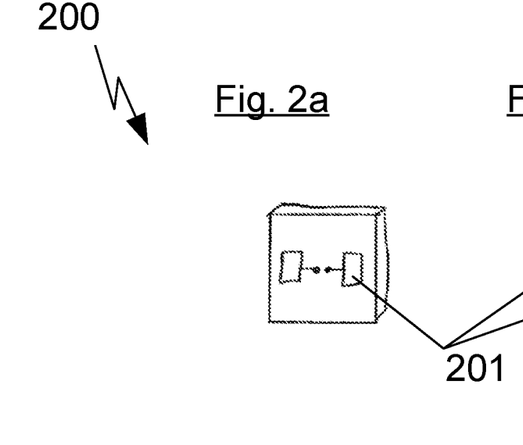
FIGS. 2A to 2C are line drawings evidencing exemplary embodiments of planar antennas and integrated radar chips, as implemented in consumer electronics.
Figure 2B:
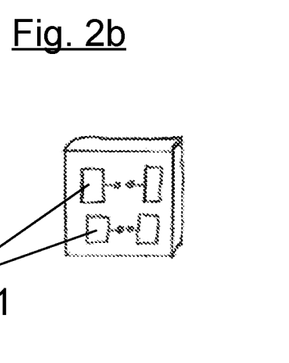
Figure 2C:
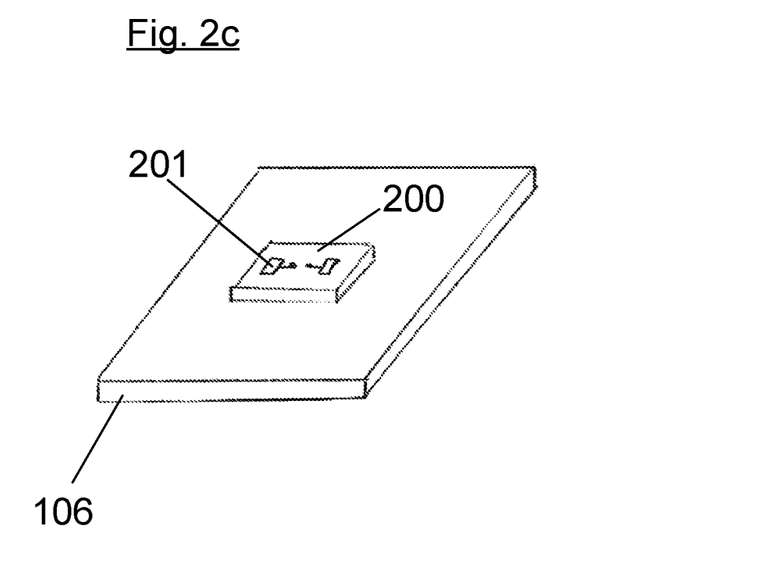

In the Subfigures 2a to 2c, FIG. 2 shows novel radar chips 200, such as are available from large semiconductor manufacturers for applications in consumer electronics in the SDR band. These radar chips 200 are configured in such a way that one (FIGS. 2a, 2c) or more (FIG. 2b) emitting patch elements designed as patch antennas 201 are already integrated in the radar chips. Further, a plurality of further circuit components are integrated in the radar chip 200. Complete radar systems can be contained on such radar chips, having all circuit elements from the generation of high-frequency signals to the digitization of received signals.

The radar chips 200 have a housing shape that allows the chips to be soldered onto a circuit board 106 in an automated manner. These housings are often executed as a surface-mounted device (SMD) in the design with the designations BGA (Ball Grid Array), LGA (Land Grid Array), or QFN (Quad Flat No Leads Package).

A contact surface of the radar chip 200, which is soldered to the circuit board 106, is located on the opposite side of the patch antennas 201 integrated into the chip. The radar chips 200 and the patch antennas 201 integrated thereon are designed in such a way that the antenna emits into free space, that is to say a vacuum or a space filled with air.

Figure 3:
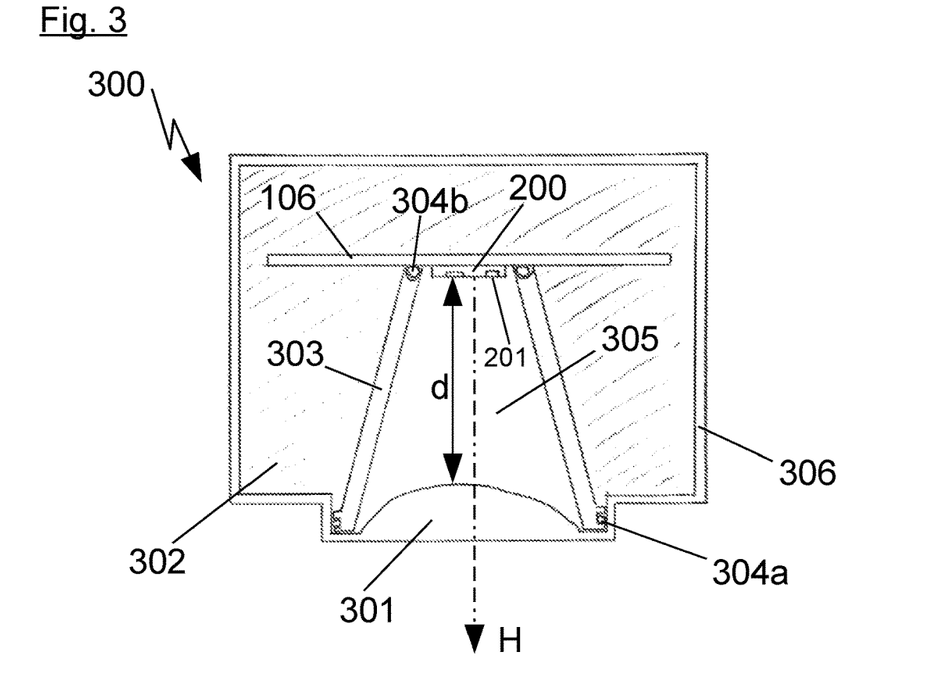
FIG. 3 is a line drawing evidencing a first exemplary embodiment of a radar measuring device according to the present application, having a conical separating apparatus.

FIG. 3 shows a first exemplary embodiment of a radar measuring device 300 according to the present application.

The radar measuring device 300 has a housing 306 in which a circuit board 106 with a radar chip 200 arranged thereupon is arranged. A fastening of the circuit board in the housing 306 is not shown in more detail, but can be done by conventional means, for example slide-in rails, latches, or screw connections.

For a use of the radar chips 200 from consumer electronics in fill level measurement, the integrated patch antennas 201 often have too little directional effect to achieve good measurement results. In particular, due to the low focusing of the main lobe of the antenna characteristic and the sidelobes typical of patch antennas, an obtained measurement result becomes too unspecific.

This antenna characteristic, which is insufficient for fill level measurement, can be improved by a dielectric lens 301, as is arranged in the exemplary embodiment shown in FIG. 3 in the main emission direction H of the patch antenna 201 arranged on the radar chip 200. The lens 301 bundles the high-frequency energy emitted in the form of electromagnetic radiation and thus improves the directional effect of the patch antenna 201. For this purpose, the dielectric lens 301 is arranged at a certain distance d from the patch antenna 201, so that it is at the focal point of the lens 301. This distance d can be precisely determined with modern field simulation programs.

By contrast to horn antennas 102 with lenses, a poorer sidelobe suppression, but a similarly good directional effect, can thus be achieved.

In the exemplary embodiment shown in FIG. 3, the lens 301 is designed as an integral component of the housing 306 and is made of the same plastic as the housing 306. For this purpose, the housing 306 and the lens 301 can be produced together by an injection molding process. The lens 301 can, however, also partly consist of a different plastic and can be inserted into the housing 306 as a separate component or overmolded with the housing 306 in a two-component injection molding process. A connection of the lens 301 to the housing 306 by a two-component injection molding process has the advantage that a hermetic connection can be achieved in this way without additional sealing by means of a material connection between the lens 301 and the housing 306.

A geometry of the lens 301 depends on its material and the distance d of the patch antenna 201. The lens 301 can—depending on the aforementioned factors and depending on other requirements of the measurement task—be executed in a biconvex or plano-convex manner. Concave designs are also conceivable.

To enable a use in potentially explosive environments, it is necessary to design the radar measuring device 300 to be explosion-proof. As described above, this can be achieved by various measures, in particular the reduction of the emitted power and the greatest possible elimination of cavities within the housing 306.

In order to prevent a potting compound 302 that is used in order to reduce cavities in the housing 306 from penetrating into an area between the patch antenna 201 and the lens 301, a separating apparatus 303 is provided in the exemplary embodiment shown in FIG. 3. If a radar measuring device 300 having a general-diffuse patch antenna 201 and a lens integrated in the housing 306 were to be potted with the potting compound 302 without additional measures, the potting compound 302 would run between the lens 301 and the patch antenna 201 and greatly attenuate the radiated HF power. Such a radar measuring device 300 would be severely restricted in terms of its measuring performance.

In the present exemplary embodiment, the separating apparatus 303 is executed as a separate component that extends from the circuit board 106 to the lens 301 in a conically widening manner. The separating apparatus 303 consists of a plastic and, in the exemplary embodiment shown in FIG. 3, is arranged between the circuit board 106 and the lens 301. At the rear, the separating apparatus 303 has a seal 304b, which in the present case is designed as an O-ring. The O-ring is arranged in a groove on the face of the separating apparatus 303 and rests against the circuit board 106 in such a way that a transition between the circuit board 106 and the separating apparatus 303 is sealed against penetration of the potting compound 302.

On the front, a seal 304a designed as an O-ring is also arranged in a circumferential groove of the separating apparatus 303. The front groove is designed in the radial direction and runs on the outside of the separating apparatus 303. The front seal 304a is thus also arranged in the radial direction to the separating apparatus 303 and sits between the separating apparatus 303 and a wall section of the housing 306. In the present exemplary embodiment, a transition from the housing 306 to the lens 301 is formed with a step that jumps forward, so that the separating apparatus sits within this step, which surrounds the lens 301.

The separating apparatus thus seals the space between the lens 301 and the radar chip 200, in particular the patch antenna 201, at both the front and the rear.

In order to ensure operation in potentially explosive areas, it must be ensured that the wiring of the HF unit 105, which in the present exemplary embodiment is executed by the radar chip 200, is designed so that the power supplied is always limited in such a way that a potential ignitable gas mixture in this cavity cannot ignite. For this reason, it is sensible for the separating apparatus 303 to enclose only the absolutely necessary areas and components in the direction of the circuit board 106, because, as already mentioned, these must be limited in terms of performance and temperature. The separating apparatus 303 is thus ideally configured in such a way that an enclosed rear surface is minimal. On the front, the separating apparatus 303 surrounds the lens, which is relatively larger than the HF unit 105.

Further, from a mechanical point of view, it must be ensured that the transitions between the separating apparatus 303 and the circuit board 106 or housing 306 are properly sealed against the potting compound 302. This can be realized via the seals 304a, 304b designed as O-rings. Alternatively, other seals 304a, 304b can also be provided, which can be injection-molded directly onto the separating apparatus 303, for example. The circuit board 106 has a sealing surface for sealing, so that the separating apparatus 303 can adjoin tightly. For this purpose, no electronic components are placed in this area. It should be noted at this point that further electronic components in addition to the radar chip, for example for actuating the radar chip 200 or a downstream signal processing, are not shown in the figures but are nonetheless present.

The present separating apparatus 303 differs from a horn antenna 102 as known in the prior art in that it can consist entirely of plastic. A horn antenna 102, on the other hand, requires at least one metallically conductive layer. A further difference lies in the signal feed. In the case of a horn antenna 102, the high-frequency signal must be fed in a certain way. This usually takes place via a metallic or metallized waveguide 104 in which the high-frequency signal generated by the circuit is excited. With these radar chips 200 having integrated patch antennas 201, as used in the present case, however, such a signal feed cannot be implemented, because this would require a direct electrical connection between antenna horn 102 and a ground surface of the patch element. This is not provided with the radar chips 200 used.

Figure 4:
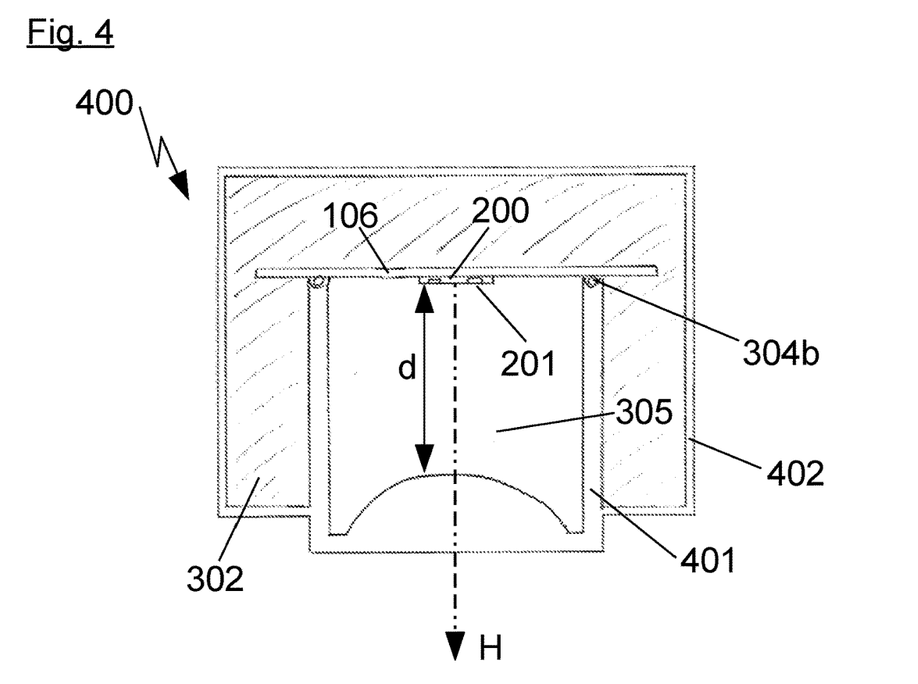
FIG. 4 is a line drawing evidencing a second exemplary embodiment of a radar measuring device according to the present application, having a separating apparatus formed integrally with the housing.

In an alternative configuration shown in FIG. 4, the separating apparatus 401 is designed as an integral part of the housing 402. In this configuration, the separating point between the housing 402 and the separating apparatus 401 is omitted, and the front seal 304a can be saved.

In a first variant, the separating apparatus 303 is transparent to high-frequency signals, so that it has no functionality from a high-frequency perspective.

In an alternative variant, the separating apparatus 303 is formed from a conductive plastic. In addition to the actual function of producing a potting compound-free space 305 between the radar chip 200 and the lens 301, it has the task of reducing unwanted sidelobes. Although these are fairly non-critical from a licensing point of view, they can generate interference in the radar signal, which worsens the measurement reliability. The HF energy radiated in the direction of the separating apparatus 303 is converted into heat by the conductive plastic, and the sidelobes are thus attenuated. This also reduces the energy of reflections that do not originate from the main lobe, so that they have less influence on the received signal.

Figure 5:
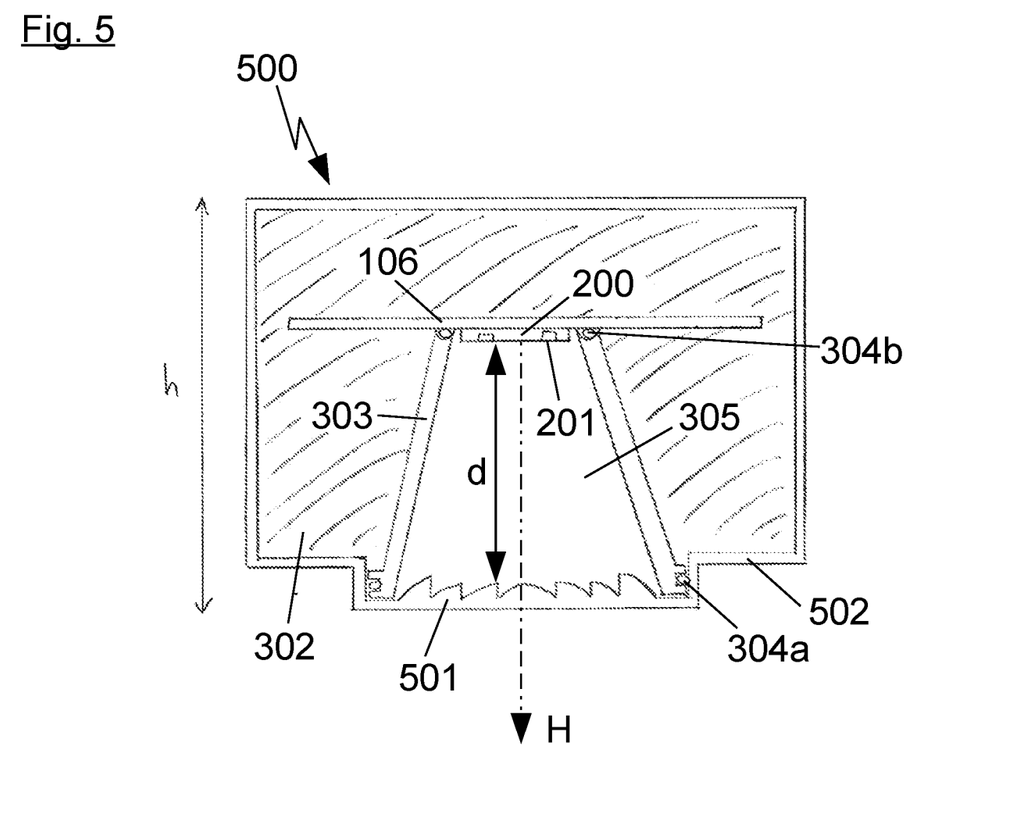
FIG. 5 is a line drawing evidencing a third exemplary embodiment of a radar measuring device according to the present application, having a conical separating apparatus and a Fresnel lens.

In a further embodiment, as shown in FIG. 5, the lens 301 is not executed as a bi-convex or plano-convex lens, but rather as the Fresnel lens 501 known to the person skilled in the art. Because the refraction of the wave fronts only takes place at the transition from air to lens material, the core idea of the Fresnel lens is that the inside of the lens can be divided into segments and removed, because it theoretically does not make any contribution to the functionality of the lens.

One of the advantages of this design is the reduced volume of the lens. It can thus be produced more easily in a plastic injection molding process. The problem with voluminous, solid plastic injection molded parts is the formation of blowholes. The cavities that arise when the poured mass cools, which are also referred to as blowholes, have a major negative impact on the high-frequency functionality of the lens. The high-frequency signals are refracted unevenly on the cavities in the material, which leads to defocusing and thus to performance losses. The greater the ratio of volume to surface area of the object to be injection molded, the greater the risk of the formation of blowholes. This risk is significantly reduced in the case of a Fresnel lens, because the ratio of volume to surface area is significantly reduced in comparison to a conventional convex lens 301.

Another advantage of a Fresnel lens is that the device housing 502 can be executed flatter overall. The height of the housing 502 is defined, among other things, by the thickness of the lens and the distance d from the lens and radar chip 200. The reduced headroom of the Fresnel lens 501 compared to the convex lens therefore has a decisive influence on the headroom h of the overall device. Compact designs have proven to be advantageous in practice. A further advantage is the reduced material costs.

The present invention relates not only to radar fill level measuring devices that operate in the V band, but can also be transferred to other radar measuring devices in the V band. There are also further frequency bands that allow such a technology, for example in the range of approximately 122 GHz.

LIST OF REFERENCE NUMBERS 100, 300 Radar measuring device
101, 306, 402 Housing
102 Horn antennas
103, 301 Lens
104 Waveguide
105 High-frequency unit
106 Circuit board
200 Radar chip
201 Patch antenna
302 Potting compound
303, 401 Separating apparatus
304a Seal
304b Seal
305 Potting compound-free space
501 Fresnel lens
502 Device housing
d Distance
h Headroom
H Main emission direction Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A radar measuring device with a housing at least partially filled with a potting compound, a general-diffuse planar antenna arranged in the housing, at least one transmitter and at least one receiver that are connected to the planar antenna, and a lens arranged in a main emission direction H of the planar antenna for radiation emitted from the planar antenna, wherein a separating apparatus is arranged in the housing and is designed and arranged in such a way that a penetration of the potting compound into an area within the separating apparatus and between the antenna and the lens is prevented, wherein the planar antenna radiates towards the lens without the use of a coupling means.

2. The radar measuring device according to claim 1, wherein the separating apparatus is made from a plastic.

3. The radar measuring device according to claim 1, characterized in that the separating apparatus is designed to radially surround the planar antenna at the rear.

4. The radar measuring device according to claim 1, wherein the separating apparatus is designed to radially surround the lens at the front.

5. The radar measuring device according to claim 1, wherein the separating apparatus is designed to widen conically in the main emission direction H.

6. The radar measuring device according to claim 1, wherein the separating apparatus has a front and/or a rear sealing apparatus in the main emission direction.

7. The radar measuring device according to claim 6, wherein the front sealing apparatus is arranged radially to the separating apparatus.

8. The radar measuring device according to claim 6, wherein the rear sealing apparatus is arranged axially to the separating apparatus, between the separating apparatus and a carrier for the antenna.

9. The radar measuring device according to claim 6, wherein the front sealing apparatus and/or the rear sealing apparatus is arranged in a groove of the separating apparatus and is designed as an O-ring.

10. The radar measuring device according to claim 1, characterized in that the separating apparatus is designed integrally with the housing.

11. The radar measuring device according to claim 1, wherein the separating apparatus is sealed to a carrier for the antenna.

12. The radar measuring device according to claim 1, wherein the separating apparatus is made from an electrically conductive plastic.

13. The radar measuring device according to claim 1, wherein the lens is designed as a plano-convex lens or as a Fresnel lens.

* * * * *